(12) United States Patent
Benjey

(10) Patent No.: US 6,880,594 B1
(45) Date of Patent: Apr. 19, 2005

(54) METHOD AND ARRANGEMENT FOR SEALING A CAPLESS FUEL TANK FILLER TUBE

(75) Inventor: Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/804,751

(22) Filed: Mar. 19, 2004

(51) Int. Cl.⁷ .................................................. B65B 1/04
(52) U.S. Cl. ................ 141/350; 220/86.2; 220/DIG. 33
(58) Field of Search ................................. 141/301, 349, 141/350; 220/86.2, DIG. 33

(56) References Cited

U.S. PATENT DOCUMENTS

| | | | | |
|---|---|---|---|---|
| 5,518,223 A | * | 5/1996 | Bivens | ........................ 267/34 |
| 5,538,055 A | * | 7/1996 | Kunz et al. | .................. 141/312 |
| 6,009,920 A | | 1/2000 | Palvoelgyi et al. | ......... 141/348 |
| 6,415,827 B1 | * | 7/2002 | Harris et al. | ................. 141/348 |
| 6,443,195 B1 | * | 9/2002 | Palvoelgyi et al. | ......... 141/350 |

* cited by examiner

Primary Examiner—Steven O. Douglas
(74) Attorney, Agent, or Firm—Roger A. Johnston

(57) ABSTRACT

A flapper door is spring biased closed against a valve seat on the underside of a filler tube bulkhead having a refueling nozzle aperture. The valve seat has an annular tapered surface and a resilient annular seal on the flapper door contacts the valve seat in wiping engagement. A pneumatic dampener retards the speed of closure of the flapper door onto the valve seat.

18 Claims, 4 Drawing Sheets

METHOD AND ARRANGEMENT FOR SEALING A CAPLESS FUEL TANK FILLER TUBE

BACKGROUND OF THE INVENTION

The present invention relates to techniques for sealing the nozzle receiving end of a fuel tank filler tube in motor vehicle applications. The present invention particularly relates to sealing such fuel tank filler tubes which are recessed in the body structure of the vehicle and typically behind a user moveable access door or cover.

Heretofore it has been widespread practice in design of motor vehicle fuel tank filler tube arrangements to provide a user moveable cover or door for providing access to the fuel nozzle receiving end of the fuel tank filler tube and to provide a removable cap or closure on the end of the filler tube. Such removable caps are typically provided with a one-way valve to permit ambient air to be drawn into the tank as fuel is withdrawn in order to prevent collapse of the fuel tank from atmospheric pressure acting thereon.

The filler tube cap has not only resulted in a relatively high manufacturing cost but has also required structure for engagement with the end of the filler tube in order to provide access for manual removal of the cap; and, this has dictated the size of the access door.

Accordingly, it has long been desired to provide a suitable way or means of sealing the nozzle receiving end of a fuel tank filler tube including a one-way air valve without the need for a separate closure cap and to thereby minimize the cost and space requirements on the vehicle for the fuel filler access door.

BRIEF SUMMARY OF THE INVENTION

The present invention provides a unique structural arrangement and method for sealing the enlarged nozzle receiving end of a fuel tank filler tube and employs a relatively rigid flapper door pivoted for movement against a bulkhead having an aperture sized to fit the refueling nozzle. A flexible seal is disposed on the flapper door for wiping engagement with a rim formed about the nozzle aperture. The flapper door is spring biased closed and is opened upon insertion of a refueling nozzle; and, upon withdrawal of the nozzle, movement of the flapper door to the closed position is dampened by pneumatic action. In one embodiment the dampening action is accomplished by a tube-and-piston type telescoping dampener; and, in another embodiment a bellows drawing air through a restrictor is employed. In the preferred practice of the invention the rim formed about the nozzle aperture in the bulkhead has a tapered or curved configuration. An annular retainer is provided on the flapper door to limit the stretching of the flexible seal and to serve as a limit stop for closure movement. Alternate practice has the flexible seal trapped in a groove in the bulkhead and the tapered or curved features formed on the trap door.

DETAILED DESCRIPTION OF THE INVENTION

Figure 1:
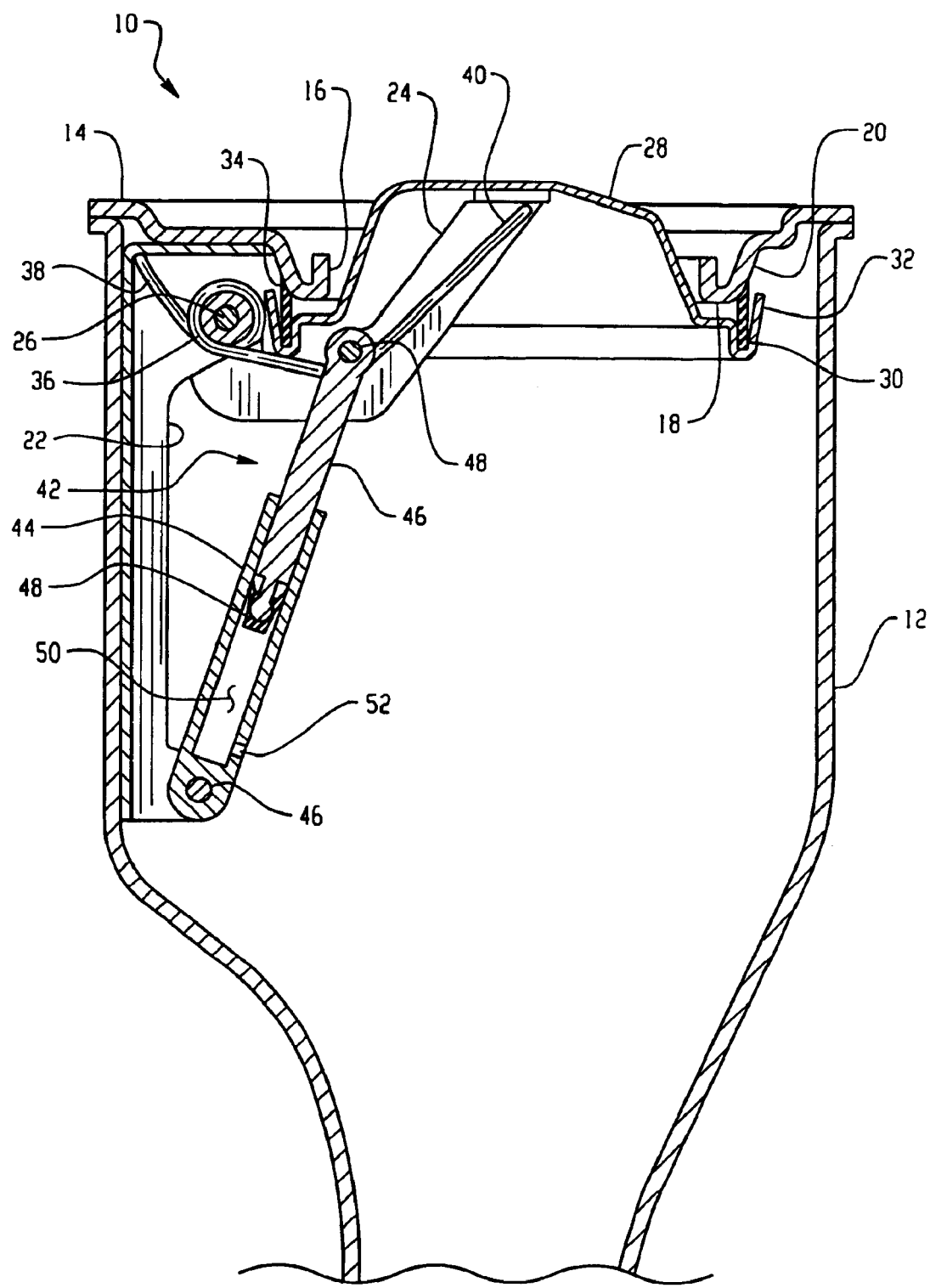
FIG. 1 is a cross-secton of the nozzle receiving end of a fuel tank filler tube with the arrangement of the invention installed therein.
Figure 2:
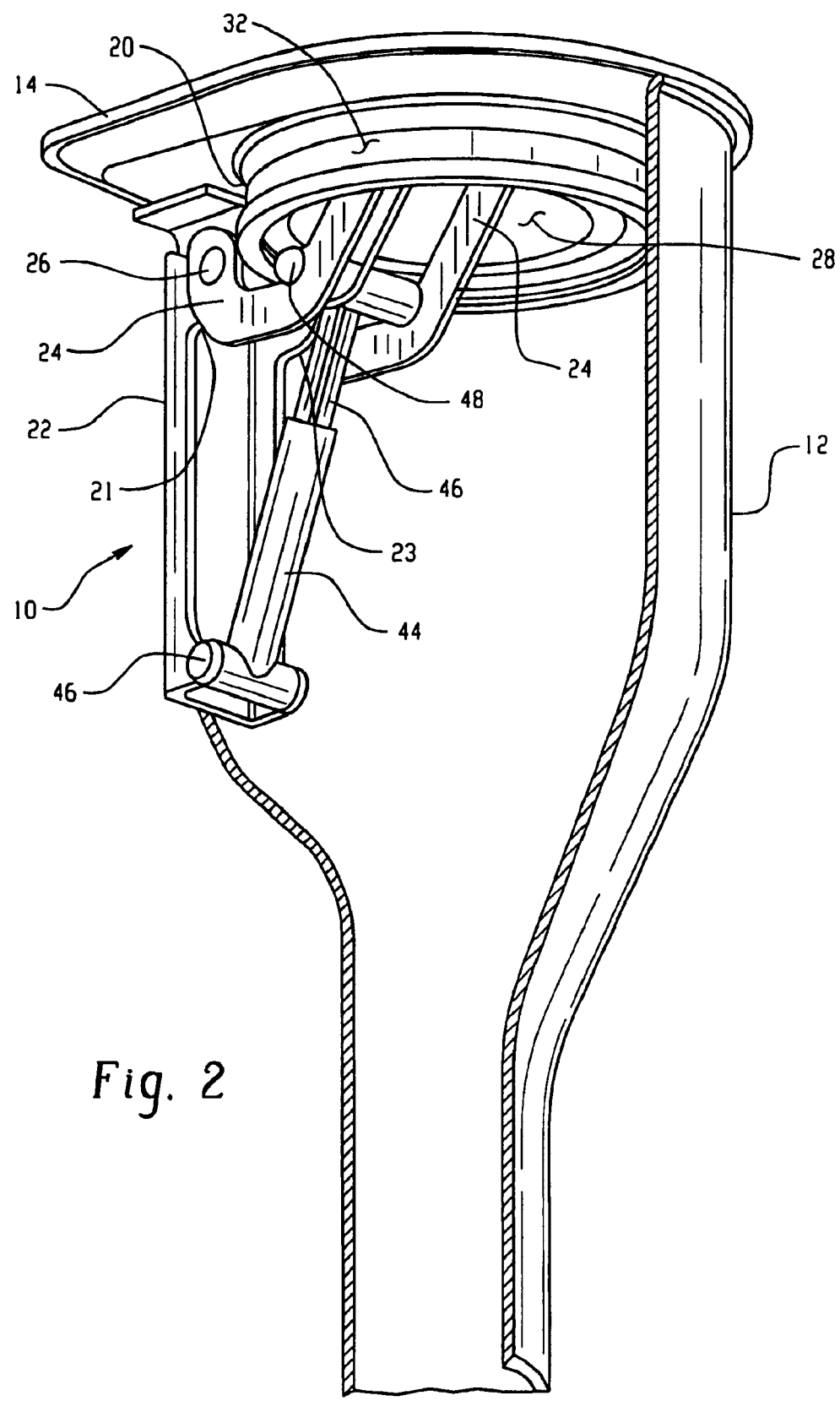
FIG. 2 is a perspective view of the assembly of FIG. 1 with portions thereof broken away to show the dampening arrangement.
Figure 3:
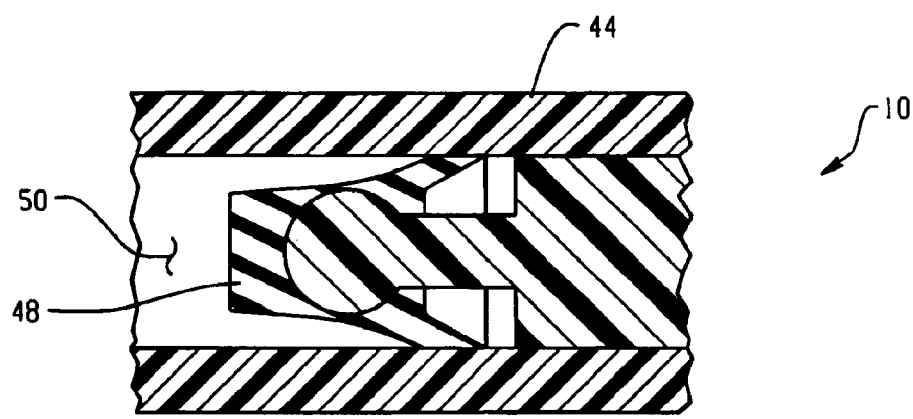
FIG. 3 is an enlarged view of a portion of FIG. 1.

Referring to FIGS. 1, 2 and 3, the first embodiment of the invention is illustrated generally at 10 and includes a fuel tank filler tube having an enlarged upper end portion 12 with a bulkhead 14 disposed thereacross, the bulkhead having a refueling nozzle receiving aperture 16 formed therein. The aperture has an annular lip or rim 18 formed thereabout which includes an annular tapered surface 20 about the outer periphery thereof, which surface may include curvature as illustrated in FIG. 1.

The bulkhead 14 includes on the downstream or underside thereof a bracket 22 which is attached thereto and extends downwardly therefrom adjacent the outer periphery of the tapered surface 20; and, bracket 22 has a pivot arm 24 mounted on the bracket 22 for pivotal movement by any suitable expedient as, for example, pivot pin 26. The end of the pivot arm 24 distal the pivot pin 26 is attached by any suitable expedient, as for example weldment, to the undersurface of a flapper door or valve member 28 which is sized and configured to extend over the rim or bead 18. The flapper door 28 preferably has an annular groove 30 formed adjacent the outer periphery thereof and has the outer lip of the groove formed to an annular flange 32 inclined to the axis of the filler tube 12.

An annular resiliently deformable or flexible wiper seal 34 has one axial edge thereof disposed in groove 30 and is secured therein preferably by crimping or other metal deformation of the material of the flapper door surrounding groove 30; and, the upper axial edge of wiper seal 34 is sized and configured to engage the surface 20 of the bulkhead in wiping contact as the flapper door 28 is closed against the rim 18. The flange 32 on the outer periphery of the flapper door is disposed to serve as a limit stop for stretching of the wiper seal 34 as the flapper door is closed.

The flapper door 28 is biased to the closed position by a torsion spring 36 which preferably includes a coiled portion disposed about pivot pin 26 with one reaction end 38 thereof contacting the undersurface of bulkhead 14 or bracket 22 and the opposite reaction end 40 contacting the undersurface of flapper door 28 or portions of the remote end of bracket 24.

A movement of the flapper door to the closed position under the urging of end 40 of spring 36 is dampened by a suitable pneumatic dampening arrangement or dampener which, in the FIG. 1 embodiment, comprises a telescoping piston and tube device indicated generally at 42. Dampener 42 includes a tube 44 having its lower end pivotally anchored by pin 46 to the lower end of bracket 22 and has a piston rod 46 with a wiper seal 48 provided on the lower end thereof received in the tube 44 with the upper end of the piston rod 46 pivotally mounted by pin 48 to the lever arm 24. It will be understood that the wiper seal is configured for minimal frictional resistance to downward movement of the rod 46 effected by a nozzle (not shown) acting against flapper door 28. Upon removal of the nozzle, seal 48 frictionally engages the inner periphery of tube 44 and upward movement thereof is resisted by a vacuum drawn in the chamber 50 in the lower portion of the tube 44 and upward movement is controlled by the rate of air flow through a bleed aperture 52 provided in the chamber 50.

Referring to FIGS. 4, 5, 6 and 7, another embodiment of the invention is indicated generally at 60 and includes a fuel tank filler tube 62 having an enlarged diameter upper end portion 64 with a bulkhead 66 provided thereon having a refueling nozzle receiving aperture 68 formed therein with an annular valve seat 70 provided about the downstream side of aperture 68, which valve seat has an annular tapered surface 72 formed on the outer periphery thereof and preferably having a curved surface 74 formed thereon. In the present practice of the invention valve seat member 70 may be formed of plastic material and attached to a metal bulkhead 66 in a suitable manner, as for example, insert molding or by press fitting over an annular rib 76 provided on the undersurface of the bulkhead 66.

Figure 4:
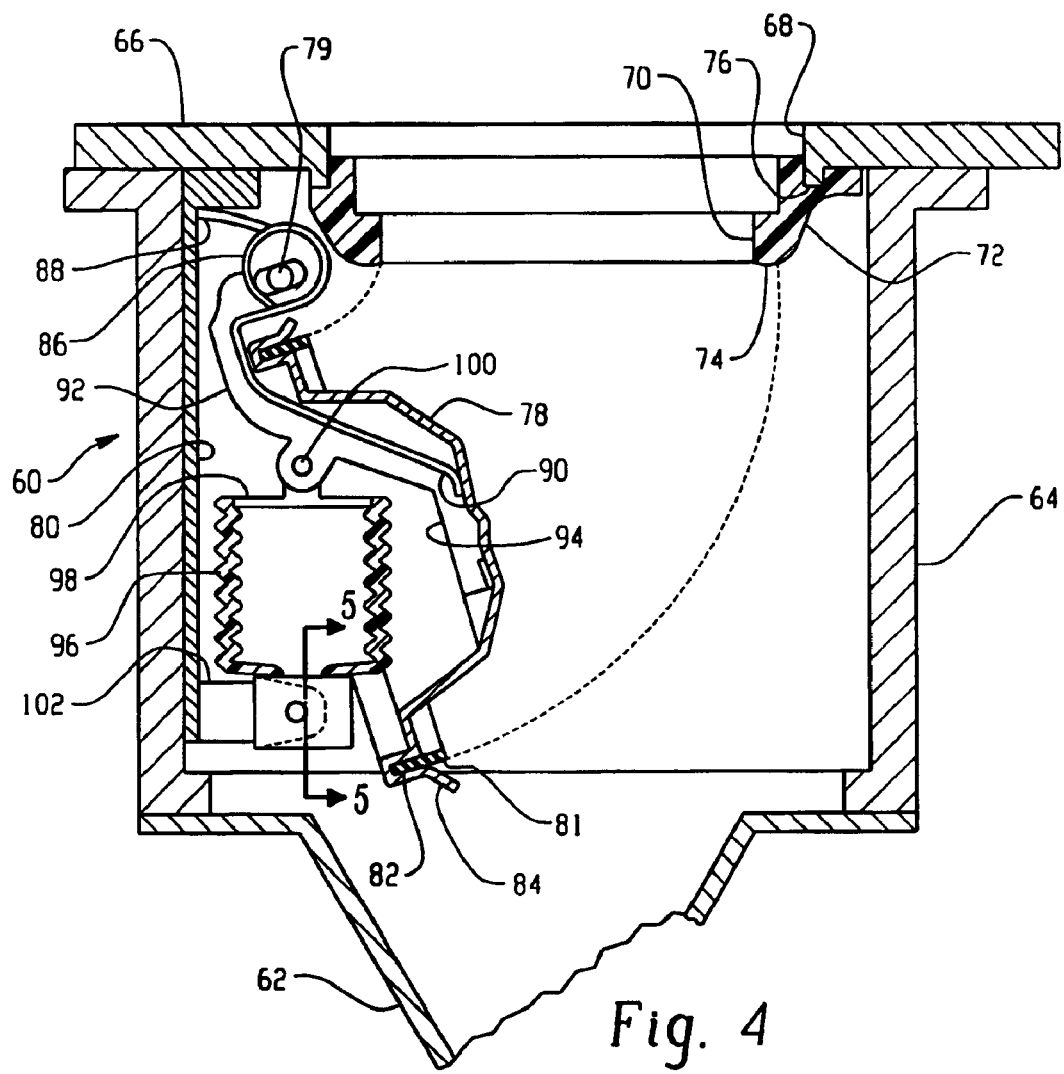
FIG. 4 is a cross-section similar to FIG. 1 of an alternate embodiment of the invention.

A flapper door or moveable valve member 78 is pivotally attached by pin 78 to a bracket 80 extending downwardly from the underside or downstream face of bulkhead 66; and, flapper door 78 is shown in solid outline in the open position in FIG. 4.

Flapper door 78 has an annular wiper seal 81 disposed thereon adjacent the outer periphery; and, in the presently preferred practice the wiper seal 80 is formed of elastomeric material of suitable flexibility for wiping on surface 72 in sliding engagement and sealing thereabout.

Flapper door 78 preferably has an annular groove 82 formed therein with one axial end of seal 80 received in the groove and secured therein as, for example, by crimping or deformation of portions of the material of flapper door 78 about groove 82. The outer lip of the groove 82 is configured as annular flange 84 which is angled outwardly and serves as a limit stop for deflection of the seal 80.

Flapper door 78 is biased to the closed position by a torsion spring 86 having a coiled portion disposed about pivot pin 79 with one end 88 contacting bracket 80 and the opposite end 90 contacting the undersurface of flapper 78.

A pivot arm 92 has one end pivoted about pin 79 received through flanges 21, 23 on bracket 22 with the remote end 94 of arm 82 attached to the undersurface of flapper 78 thereby locating the flapper for pivotal movement with respect to valve seat 74.

Pivot arm 92 has a bellows 96 with the upper end 98 thereof attached pivotally to the arm by pin 100 with the lower end of the bellows secured to lugs 102 formed on the bracket 80.

Figure 5:
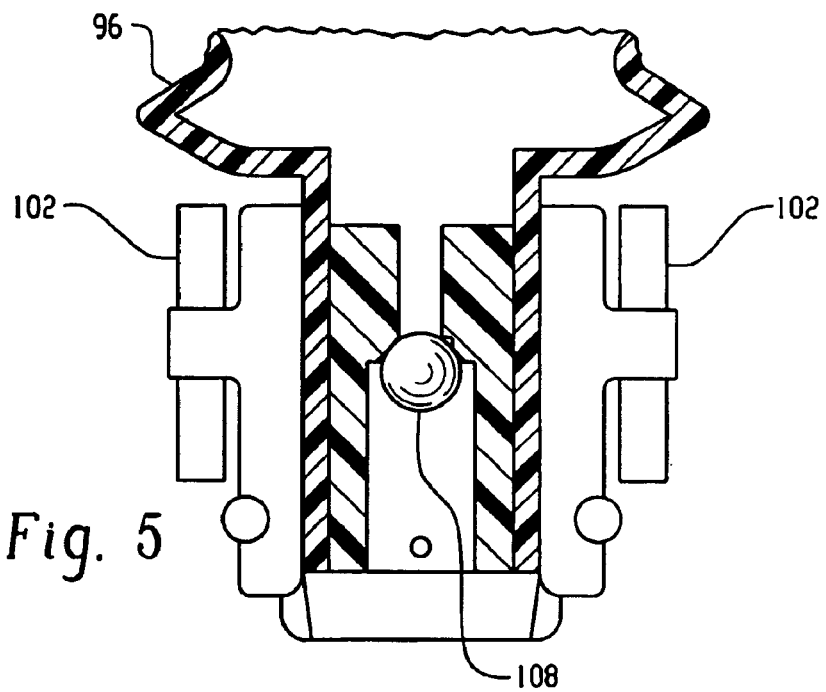
FIG. 5 is a section view taken along section indicating lines 5—5 of FIG. 4.
Figure 6:
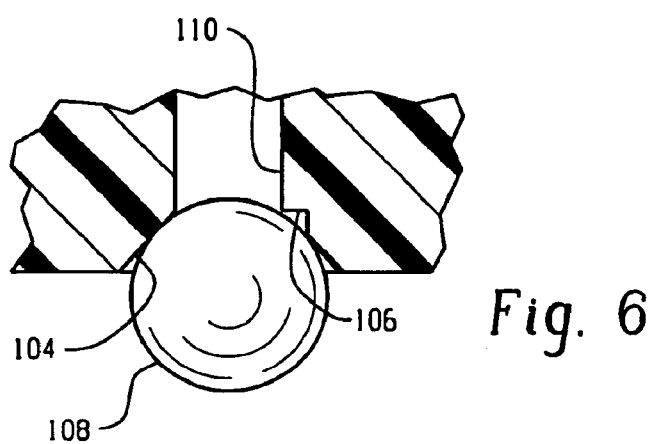
FIG. 6 is an enlarged view of a portion of FIG. 5.
Figure 7:
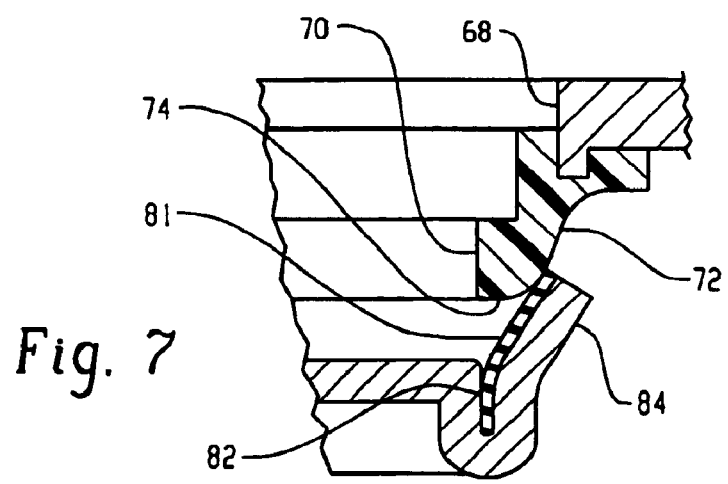
FIG. 7 is an enlarged view of a portion of FIG. 4.

Referring to FIGS. 5 and 6, the lower end of bellows 96 has a valve seat 104 formed thereon with a bleed notch 106 provided therein; and, valve seat 104 has seated thereagainst a ball check valve member 108 which controls flow of air through passage 110 into the bellows 96.

In operation, as spring end 90 biases flapper door 78 toward the closed position, a vacuum is drawn in bellows 96; and, the ball check valve 108 is seated against the valve seat 104 and air is entrained into the bellows only through the restricted area of the bleed notch 106 and thus a pneumatic dampening action to the movement of the flapper door is accomplished.

It will be understood that upon insertion of a refueling nozzle (not shown) into aperture 68 and through valve seat 78 the nozzle pushes open the flapper door 78, bellows 96 is compressed and air flows freely past the check valve member 108, thus providing minimal resistance to opening of the flapper door.

The present invention thus provides a simple to install and easily manufactured flapper door type closure and seal for the refueling nozzle receiving end of a fuel tank filler tube. The invention enables the door to be opened easily upon insertion of a refueling nozzle; and, upon withdrawal of the nozzle the door is biased to the closed position for sealing about the nozzle aperture with the closing movement of the door dampened by a pneumatic dampener and sealing accomplished in a wiping manner to ensure a seal.

Although the invention has hereinabove been described with respect to the illustrated embodiments, it will be understood that the invention is capable of modification and variation and is limited only by the following claims.

What is claimed is:

1. A method of sealing a capless fuel tank filler tube comprising:
    (a) disposing a bulkhead having a nozzle receiving opening therein in the inlet region of the filler tube and forming a rim about the opening;
    (b) disposing a door for pivotal movement on the downstream side of said bulkhead and biasing said door for movement in a direction toward a closed position contacting the rim; and,
    (c) forming an annular groove in the door and disposing an annular flexible seal in said groove and crimping a portion of the door and retaining the seal in the groove and engaging said seal in wiping contact with said rim in the closed position.

2. The method defined in claim 1, wherein said step of forming a rim includes forming a tapered surface.

3. The method defined in claim 2, wherein said step of forming a rim includes forming a curved surface.

4. The method defined in claim 1, wherein said step of disposing a flexible seal includes forming a wiper of elastomeric material having relatively high resistance to fuel vapor permeation and attaching the wiper to the door.

5. The method defined in claim 1, wherein said step of disposing a door includes forming a door of stamped metal.

6. The method defined in claim 1, wherein said step of disposing a flexible seal includes forming an annular groove in the door and inserting a portion of the seal in the groove.

7. The method defined in claim 1, wherein said step of disposing a door includes stamping a door from sheet metal with an annular groove and inserting the flexible seal in the groove.

8. The method defined in claim 1, wherein said step of biasing the door includes disposing a piston in a tube and dampening the movement of the door in the direction toward contacting the rim.

9. A sealing arrangement for a fuel tank filler tube comprising:
  (a) a filler tube having a bulkhead with a nozzle receiving aperture therein disposed in the region of the inlet end of the tube with the periphery of the aperture having a rim thereabout;
  (b) a flapper door disposed for pivotal movement on the downstream side of the bulkhead including an annular seal on one of said door and said rim; and,
  (c) means operative for biasing said flapper door for movement in a direction toward said bulkhead for closing, including a piston and tube device for dampening said movement.

10. The sealing arrangement defined in claim 9, wherein said bulkhead and said rim are formed integrally as a one-piece member.

11. The sealing arrangement defined in claim 9, wherein said rim is formed with one of a tapered and a spherical surface.

12. The sealing arrangement defined in claim 9, wherein said seal is formed of elastomeric material.

13. The sealing arrangement defined in claim 9, wherein said means operative for biasing includes a torsion spring.

14. The sealing arrangement defined in claim 9, wherein said door includes an annular groove formed therein with a portion of said seal received in said groove.

15. The sealing arrangement defined in claim 9, wherein said seal contacts the radially outer surface of said rim.

16. The sealing arrangement defined in claim 9, wherein said annular seal is formed of elastomeric material relatively impervious to fuel vapor.

17. The sealing arrangement defined in claim 9, further comprising apparatus operable for dampening movement of the flapper door in the direction toward the bulkhead.

18. The sealing arrangement defined in claim 17, wherein said apparatus for dampening includes a pneumatic dampener.

* * * * *